April 20, 1965   J. C. BLACKETT   3,178,901

ELECTROLYTIC CONTROL APPARATUS

Filed Oct. 29, 1962

INVENTOR.
JAMES C. BLACKETT

BY
*Clyde C. Blinn*

ATTORNEY

United States Patent Office 3,178,901
Patented Apr. 20, 1965

3,178,901
ELECTROLYTIC CONTROL APPARATUS
James C. Blackett, Minneapolis, Minn., assignor to Honeywell Inc., a corporation of Delaware
Filed Oct. 29, 1962, Ser. No. 233,718
8 Claims. (Cl. 62—139)

The present invention is concerned with an improvement in a control apparatus having at least one electrode for sensing a change in resistance of material between the electrode and ground wherein the electrode is connected into a bridge circuit supplied with A.C. power. In particular, the invention makes use of a D.C. power source which is periodically connected between the electrode and ground to reduce the contamination or corrosion effect of the electrode resulting from the alternating current.

In a water softening apparatus in which the hard water is passed through a resin or ion exchange material for removing calcium, magnesium or other "hard ion" substances, the ion exchange material eventually needs to be regenerated. One particular manner of determining the need for regeneration makes use of the change in resistance of the ion exchange material as the softening characteristics become depleted. In such an application, at least one electrode is placed in the ion exchange material of the water softener and the resistance of the ion exchange material is measured by an A.C. powered bridge circuit. As alternating current passes through the ion exchange material, the electrode becomes contaminated by the formation of a corrosion over the surface of the electrode which increases the resistance in the electrical circuit to affect the commencement of the regeneration cycle. Various means have been attempted for reducing the contamination of the electrode.

The present invention makes use of a D.C. power source which is periodically connected between the electrode and ground so that current flow removes the corrosion from the electrode similar to an electroplating process. A timer switch connects the sensor which measures the resistance of ion exchange material into the control circuit a short period to determine when the regeneration cycle must be started. The timer switch also connects the D.C. power source between the electrode and ground during the remaining period to keep the electrode clean.

Obviously, the present invention can be applied to other environments where the resistance of material is measured by an A.C. bridge and contamination of the electrode must be kept to a minimum; therefore, an object of the present invention is to provide a circuit for measuring the resistance of a material between two parts of an electrical circuit and maintaining the circuit free of foreign resistance by periodically connecting a D.C. current in the circuit.

Another object of the present invention is to provide an A.C. bridge circuit having a sensor for measuring the resistance of a material with a timer means for periodically connecting a D.C. current to the sensor to remove the foreign resistance caused by corrosion of the sensor.

These and other objects of the present invention will become apparent upon a study of the following specification and drawing of which FIGURE 1 is a schematic representation of one particular use of the present invention in a water softening system for controlling the regeneration scheduler.

Figure 1:
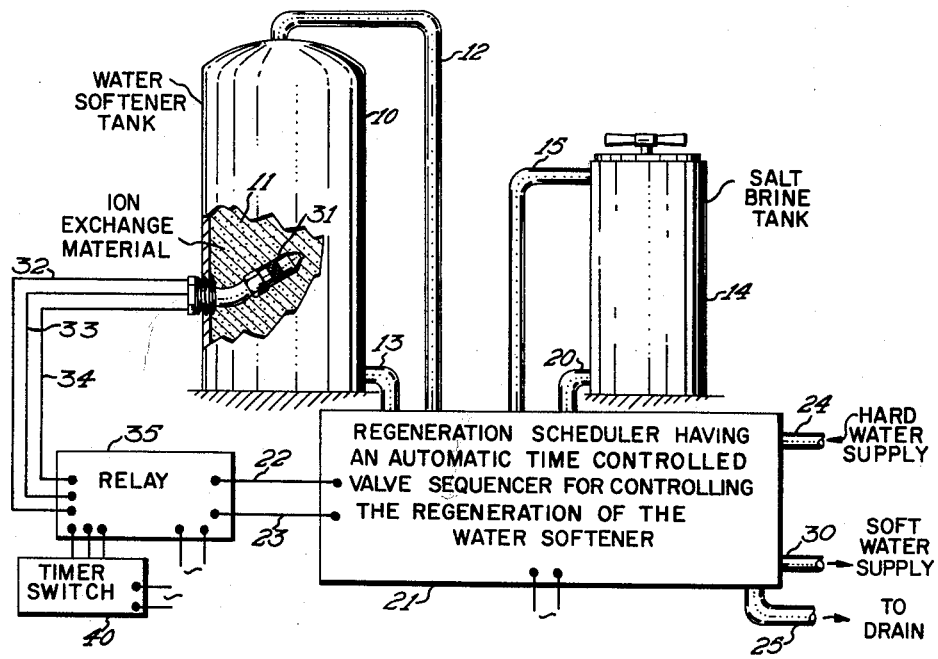

Referring to FIGURE 1, a water softening system has a tank 10 containing an ion exchange material or resin 11 through which hard water flows as supplied through a pipe 12 and leaving tank 10 as soft water through a pipe 13. A salt tank 14 has a pipe 15 and 20 through which water flows to obtain salt water for the regeneration of the ion exchange material 11. A regeneration scheduler 21 which is connected to tank 10 and tank 14 provides for the regeneration of resin 11 upon the closure of the circuit of conductors 22 and 23 connected to the input terminal of scheduler 21. Scheduler 21 is of a conventional type, which is quite common in domestic water softeners, similar to that shown in the U.S. Patent 2,012,194. Upon the operation of the scheduler, a sequential operation of numerous valves provides for the flow of hard water from a supply 24 through the salt tank and in a reverse manner through tank 10. The water is then directed into a drain 25. After the ion exchange material 11 is recharged by replacing the "hard ions" with soft ions, the normal operation of the water softener receives hard water from supply 24 and after passing the water down through tank 11, a soft water supply is available from pipe 30.

A sensor 31 is mounted inside tank 11. The sensor is connected by three conductors 32, 33 and 34 to a bridge relay 35. Connected to the bridge relay is a timer switch 40. Sensor 11 is capable of measuring the resistance of the ion exchange material and upon a change in the resistance to a predetermined value, relay 35 closes the circuit between conductors 22 and 23 to initiate the operation of the regeneration scheduler.

Figures 2, 3:
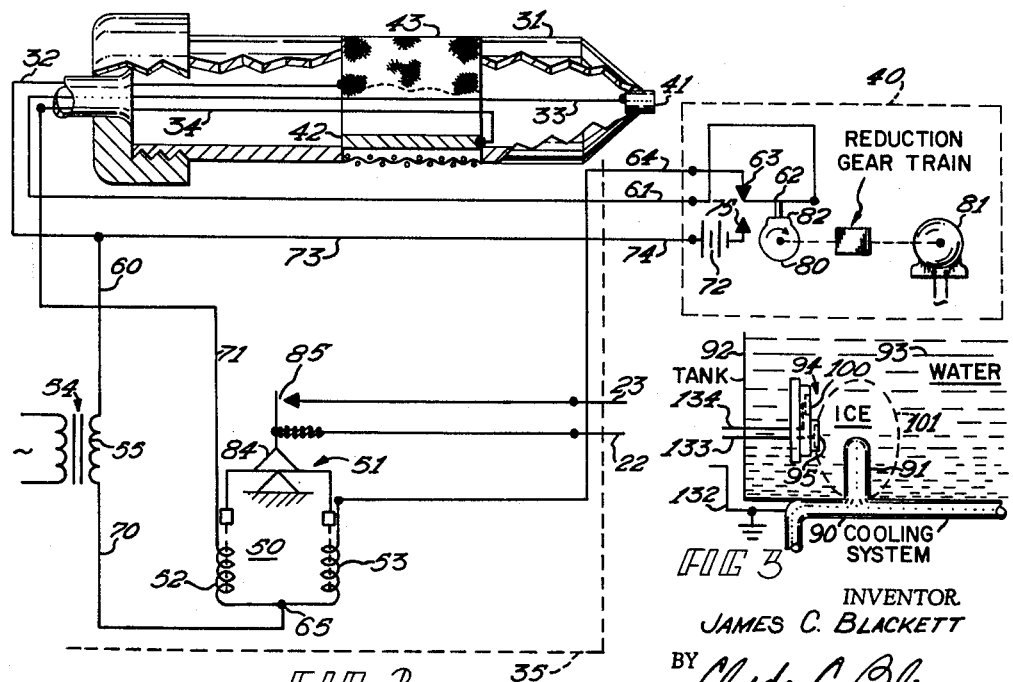
FIGURE 2 is a schematic drawing of the circuit for measuring the resistance of the ion exchange material in the system of FIGURE 1 with the anti-contamination means for the sensor.
FIGURE 3 is another embodiment of the present invention applicable to the use of a sensor for measuring the formation of ice in an ice machine.

Referring to FIGURE 2, sensor 31 has an exposed electrode 41 and a protected electrode 42. Electrode 42 is surrounded by a screen 43 to prevent the ion exchange material in tank 10 from contacting the electrode. By means of screen 43, water can pass through the screen to contact electrode 42. Conductor 32 is connected to screen 43, conductor 33 is connected to electrode 41, and conductor 34 is connected to electrode 42.

A bridge circuit 50 of a conventional type comprises a balancing switch operator or relay 51 which is controlled by the current flow through a pair of coils 52 and 53. Such an operator is quite conventional and is shown in another application in the Cunningham Patent 2,101,808. The particular bridge circuit used is selected to maintain the cost of the control apparatus at a minimum; however, any conventional type of bridge circuit could be used. A source of power 54 has a secondary winding 55. Sensor 31 is connected to the bridge circuit of relay 35 in the following manner: from secondary 55, a conductor 60, conductor 32, screen 43, a circuit through the ion exchange material, electrode 41, conductor 33, conductor 61, movable member 62 of the timer switch 40, contact 63, conductor 64, coil 53, terminal 65 and through conductor 70 back to the other side of secondary 55. Another circuit exists from screen 43 through the water between the screen and electrode 42, conductor 34, a conductor 71, coil 52, and back through conductor 70 to the other side of the source of power. Conductor 60 is connected to a D.C. power source of battery 72 through a circuit traced as follows: conductor 73, conductor 74, to the power source 72, the other side of the power source is connected to a contact 75, which is engaged by member 62 when a cam 80 driven by a constant speed motor 81 moves so that the high portion 82 allows member 62 to drop.

Under the normal operation with the movable member 62 of the timer switch engaging contact 63, the amplifier relay 35 is connected to sensor 31 to compare the resistance between the ion exchange material and the water. A measure of the resistance of the ion exchange material is available to control the operation of balanceable member 84 of the bridge circuit 50 which controls the operation of switch 85 connected between conductors 22 and 23. When the resistance of ion exchange material varies, bridge circuit 50 is modified to teeter or move the balanceable member 84 to close the switch 85 to initiate the regeneration cycle. During the normal operation, with the A.C. voltage applied between electrode 41 and screen 43, a contamination of electrode 43 comes about. The contamination generally is a coating over the electrode which increases the resistance of the circuit.

Referring to FIGURE 3, another embodiment of the present invention is shown. In this embodiment the invention is applied to an ice cube or ice growing apparatus of the type shown in the Blackett Patent 2,954,679. A source of cooled medium connected to pipe 90 is supplied by a conventional refrigeration apparatus. Pipe 90 has a number of projections 91 extending upward from the bottom of a tank 92 which is filled with water 93. A sensor 94 is of the two electrode type having a first electrode 95 which protrudes farther to the right than a second electrode 100. Electrode 95 is engaged by the ice of a cube 101 as the cube grows on the cooled projection 91. When ice contacts electrode 95, the resistance between the ground projection 91 and the electrode 95 changes from that of water to that of ice. This change in resistance is used for control purposes to control the termination of the cooling operation of the cubes machine. By terminating the supply of cooling to projection 91 cube 101 will float upward and another cycle can be commenced. Electrode 100 is used to provide a measure of the resistance of the water between the electrode and ground. Electrode 100 is connected in an adjacent leg in the bridge circuit to which electrode 95 is connected to compensate for the changes in resistance of the water. In either of the applications of the electrodes whether it be in the water softener control of FIGURES 1 and 2 or the ice bank control of FIGURE 3, a contamination of the electrodes 41 and 95 takes place when an A.C. voltages is constantly applied to the circuit. By connecting a D.C. voltage between conductors 132 and 133 during the portion of the operating cycle which is not used for control purposes, electrode 95 can be maintained clean of corrosion which tends to increase the resistance in the circuit and change the control point.

*Operation*

Referring to FIGURE 2, when the sensor 31 is placed in the ion exchange material of a water softener similar to the diagram of FIGURE 1, the resistance of the ion exchange material is measured by the resistance between electrode 41 and screen 43. The resistance of the water is measured by the resistance between electrode 42 and screen 43 as the ion exchange material cannot enter the space between the screen and electrode 42. When these two resistance measurement circuits are connected in opposite legs of the bridge circuit 50, a predetermined change in the resistance of the ion exchange material beyond some selected value causes the bridge to become unbalanced to teeter the movable member 84 and close switch 85 to initiate the operation of the regeneration scheduler 21 as shown in FIGURE 1.

By means of timer 40, the normal operation of the control to sense the resistance of the ion exchange material only takes place when movable member 62 is in the upward position as shown. By means of the motor 81, cam 80 is driven constantly and the high portion 82 only includes a small percentage of the total area of the cam. After the sensing operation takes place and member 62 moves downward to engage contact 75, the D.C. voltage from the source of power 72 is applied between screen 43 and contact 41. The circulation of the D.C. current through this circuit tends to clean the electrode 41 in a manner similar to that of an electroplating process. While the collection of gas around the electrode is known to exist, the gas will only remain around electrode 41 as long as the D.C. voltage is connected to the circuit. When the normal sensing operation takes place as the high portion 82 of cam 80 moves member 62 upward against contact 63, the voltage in the sensor circuit is A.C. and any gas which is collected would immediately be de-ionized.

The operation of the embodiment of FIGURE 3 is quite similar. When conductors 132, 133 and 134 are connected to a bridge circuit such as shown in FIGURE 2 as conductors 32, 33 and 34 are connected, the bridge circuit 50 responds to the measure of resistance between the two circuits existing between electrode 95 and ground and electrode 100 and ground. When the resistance of these two circuits differs by some predetermined amount, the refrigeration apparatus can be de-energized through a control circuit connected to conductors 22 and 23. By means of the timer switch 40, the D.C. voltage can be applied between electrode 95 and ground during the non-control portion of the cycle of the motor driven cam 80 to have the D.C. current maintain electrode 95 clean.

While the present invention has been described in one particular manner by the disclosure of two embodiments, the intent of the applicant is to limit the scope of the invention to the appended claims.

I claim:
1. In control apparatus for initiating a regeneration cycle of a water softener wherein an ion exchange material which changes in electrical resistance is used, control means adapted to initiate the regeneration cycle, an A.C. bridge circuit having a source of A.C. power and an output circuit, means connecting said output circuit to said control means, at least one electrode mounted in and electrically insulated from a container of said ion exchange material through which water passes to remove "hard ion" material, said electrode engaging said material and being connected in one leg of said bridge circuit to respond to the resistance between said electrode and the water which is indicative of the condition of said ion exchange material, second electrode means contacting the water, circuit means connecting said second electrode to said bridge circuit, timer operated switch means, a source of D.C. power, and means connecting said switch means to said bridge circuit whereby said electrode is periodically disconnected from said A.C. bridge circuit and connected to said D.C. source.

2. In control apparatus for initiating the regeneration cycle of a water softener wherein an ion exchange material in a container changes in resistance as the effectiveness of the material changes, sensor circuit means comprising at least one electrode for measuring the resistance of a representative portion of the ion exchange material, a bridge circuit having an output, a source of A.C. power connected to said bridge circuit, circuit means connecting said sensor means to said bridge circuit whereby the resistance measured by said sensor means is impressed on said bridge circuit, control means for starting the regeneration cycle, means connecting said control means to said output, a source of D.C. power, a timer switch means, circuit means connecting said D.C. source to said sensor means to pass a direct current between said electrode and another side of the circuit to keep said electrode clean, further circuit means including said timer switch means to periodically disconnect said D.C. source and connect said sensor means to said bridge circuit whereby the presence of a predetermined resistance of said ion exchange material causes initiation of the regeneration cycle.

3. In a control system, at least one electrode forming a part of a circuit for measuring the resistance of a material between said electrode and ground, an A.C. circuit having a source of A.C. voltage and an output adapted to initiate an operation, circuit means connecting said electrode to said A.C. circuit whereby an A.C. voltage is applied between said electrode and ground, said A.C. voltage causing a contamination of said electrode to increase the circuit resistance, a source of D.C. voltage and means for intermittently disconnecting said A.C. source and connecting said source of D.C. voltage between said electrode and ground to cause said electrode to be cleaned.

4. In a control system, at least one electrode forming a part of a circuit for measuring the resistance of a material between said electrode and ground, an A.C. circuit having an A.C. source of voltage and an output adapted to initiate an operation, circuit means connecting said electrode to said A.C. circuit whereby an A.C. voltage is applied between said electrode and ground, said A.C. voltage causing a contamination of said electrode by the circulation of an A.C. polarizing current to increase the circuit resistance by corroding said electrode, a source of D.C. voltage and means for periodically disconnecting said A.C. voltage and connecting of source of D.C. voltage between said electrode and ground to cause a direct current to flow to clean said electrode.

5. In a control system adapted for use with a water cooling device wherein ice is formed when water surrounds a cooled surface, said surface being grounded to an electrical ground, an electrode mounted a predetermined distance from said cooling surface, a control circuit adapted to control the cooling device, timer switch means, means including said timer means for connecting said electrode to said control circuit whereby upon the formation of ice between said surface and said electrode a change in resistance renders said control device operative, a source of D.C. power, and further means including said timer means for connecting said D.C. power between said ground and said electrode for a selected period of time to remove contamination from said electrode.

6. A pair of electrodes adapted to be immersed in a liquid, an electrical circuit, circuit means connecting said electrodes to said electrical circuit to provide an output adapted to initiate a control operation, at least one of said electrodes developing a deposit after a predetermined time of operation, and means disconnecting said electrical circuit and connecting a unidirectional current source periodically between said electrodes to circulate a current between said electrodes to clean said one of said electrodes to remove said deposit.

7. In a control system, at least one electrode adapted to be immersed in a liquid, an electrical circuit, circuit means connecting said electrode to said circuit to provide an output, said electrode developing an undesirable deposit on said electrode during normal operation, and means for periodically disconnecting said electrical circuit and connecting unidirectional current source in the circuit containing said electrode to clean said electrode of said undesirable deposit.

8. A control apparatus responsive to the resistance of material in a container, sensor circuit means comprising at least one electrode for engaging and measuring the resistance of a representation portion of the material, a network circuit having output, a source of A.C. power connected to said network circuit, first and second circuit means connecting said sensor means of said network circuit whereby the resistance measured by said sensor is impressed on said network circuit, control means, means connecting said control means to said output, a source of D.C. power, a timer switch means, circuit means including said timer switch means and said first and said second circuit means to connect said sensor means to said network circuit whereby upon the presence of a predetermined resistance between said first and second circuit means as determined by the resistance of the material said control means is energized, and switch circuit means including said timer switch means for disconnecting said network circuit from said sensor and connecting said D.C. source to said first and said second circuit means to pass direct current between said electrode and said portion of the material to maintain said electrode clean by electrolysis.

References Cited by the Examiner

UNITED STATES PATENTS

| | | | |
|---|---|---|---|
| 1,755,479 | 4/30 | Jones | 324—30 X |
| 2,010,242 | 8/35 | Preisman | 324—30 |
| 2,108,294 | 2/38 | Doyle et al. | 324—30 X |
| 2,905,838 | 9/59 | King et al. | 307—112 |
| 2,941,097 | 6/60 | Steele | 307—112 |
| 2,959,026 | 11/60 | Swanson | 62—138 |
| 2,994,821 | 8/61 | Dravnieks | 324—65 |
| 3,038,610 | 6/62 | Hetherington | 210—96 |
| 3,059,777 | 10/62 | Frimodig | 210—96 |
| 3,080,726 | 3/63 | Tenniswood | 62—138 |

ROBERT A. O'LEARY, *Primary Examiner.*

EDWARD J. MICHAEL, *Examiner.*